(12) United States Patent
Yang et al.

(10) Patent No.: US 11,314,921 B2
(45) Date of Patent: Apr. 26, 2022

(54) TEXT ERROR CORRECTION METHOD AND APPARATUS BASED ON RECURRENT NEURAL NETWORK OF ARTIFICIAL INTELLIGENCE

(71) Applicant: BAIDU ONLINE NETWORK TECHNOLOGY (BEIJING) CO., LTD., Beijing (CN)

(72) Inventors: Chunjie Yang, Beijing (CN); Shujie Yao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1019 days.

(21) Appl. No.: 15/856,155

(22) Filed: Dec. 28, 2017

(65) Prior Publication Data

US 2018/0349327 A1    Dec. 6, 2018

(30) Foreign Application Priority Data

Jun. 5, 2017 (CN) .......................... 201710413707.9

(51) Int. Cl.
| | |
|---|---|
| G06F 40/10 | (2020.01) |
| G10L 25/30 | (2013.01) |
| G06N 3/08 | (2006.01) |
| G06N 3/04 | (2006.01) |
| G06F 40/232 | (2020.01) |

(52) U.S. Cl.
CPC ............ *G06F 40/10* (2020.01); *G06F 40/232* (2020.01); *G06N 3/0445* (2013.01); *G06N 3/08* (2013.01); *G06N 3/084* (2013.01); *G10L 25/30* (2013.01)

(58) Field of Classification Search
CPC ..... G06F 40/10; G06F 40/232; G06N 3/0445; G06N 3/08; G06N 3/084; G10L 25/30
See application file for complete search history.

(56) References Cited

U.S. PATENT DOCUMENTS

| | | | |
|---|---|---|---|
| 7,313,550 B2 * | 12/2007 | Kulkarni | G06N 3/086 706/21 |
| 9,037,967 B1 * | 5/2015 | Al-Jefri | G06F 40/232 715/257 |
| 9,318,102 B2 * | 4/2016 | Lee | G10L 15/01 |
| 10,395,656 B2 * | 8/2019 | Yao | G06N 3/08 |

(Continued)

FOREIGN PATENT DOCUMENTS

| | | |
|---|---|---|
| CN | 103885938 | 6/2014 |
| CN | 105550173 | 5/2016 |

(Continued)

OTHER PUBLICATIONS

SIPO, Second Office Action for CN Application No. 201710413707.9, dated Aug. 31, 2020.

(Continued)

*Primary Examiner* — Fariba Sirjani
(74) *Attorney, Agent, or Firm* — Hodgson Russ LLP

(57) ABSTRACT

A text error correction method and a text error correction apparatus based on a recurrent neural network of artificial intelligence are provided. The method includes: acquiring text data to be error-corrected; performing error correction on the text data to be error-corrected by using a trained recurrent neural network model so as to generate error-corrected text data.

6 Claims, 2 Drawing Sheets

301 acquiring a corpus of text pairs to be trained, each of the text pairs comprising an erroneous text and an accurate text corresponding to the erroneous text

302 training a preset recurrent neural network model by using the corpus of the text pairs so as to determine the trained recurrent neural network model

(56) References Cited

U.S. PATENT DOCUMENTS

| | | | | |
|---|---|---|---|---|
| 2006/0074924 A1* | 4/2006 | Tilei | .................. | G10L 15/063 |
| 2009/0192798 A1* | 7/2009 | Basson | ................. | G06F 40/58 |
| | | | | 704/270 |
| 2011/0320189 A1* | 12/2011 | Carus | ................. | G06F 40/20 |
| | | | | 704/9 |
| 2013/0013311 A1* | 1/2013 | Zheng | ................. | G10L 15/197 |
| | | | | 704/257 |
| 2014/0163975 A1* | 6/2014 | Lee | ................. | G10L 15/01 |
| | | | | 704/231 |
| 2015/0066496 A1* | 3/2015 | Deoras | ................ | G06N 3/0454 |
| | | | | 704/232 |
| 2017/0139905 A1* | 5/2017 | Na | ................. | G06N 3/08 |
| 2018/0121800 A1* | 5/2018 | Kanda | ................. | G06N 3/0445 |
| 2018/0267956 A1* | 9/2018 | Chang | ................. | G06N 3/0445 |
| 2018/0329883 A1* | 11/2018 | Leidner | ................ | G06F 16/2237 |
| 2018/0349327 A1* | 12/2018 | Yang | ................. | G06F 40/232 |
| 2018/0349347 A1* | 12/2018 | Ringger | ............ | G06Q 30/0251 |

FOREIGN PATENT DOCUMENTS

| | | |
|---|---|---|
| CN | 106598939 | 4/2017 |
| CN | 106610930 | 5/2017 |

OTHER PUBLICATIONS

SIPO, First Office Action for CN Application No. 201710413707.9, dated Mar. 12, 2020.

\* cited by examiner

TEXT ERROR CORRECTION METHOD AND APPARATUS BASED ON RECURRENT NEURAL NETWORK OF ARTIFICIAL INTELLIGENCE

CROSS-REFERENCE TO RELATED APPLICATION

This application claims priority to and benefits of Chinese Patent Application Serial No. 201710413707.9, filed with the State Intellectual Property Office of P. R. China on Jun. 5, 2017, the entire content of which is incorporated herein by reference.

FIELD

The present disclosure relates to a field of computer technology, and more particular to a text error correction method and a text error correction apparatus based on a recurrent neural network of artificial intelligence.

BACKGROUND

Artificial Intelligence (AI) is a new technological science that studies and develops theories, methods, techniques and application systems for simulating, extending and expanding human intelligence. AI is also a branch of computer science, seeking to understand the essence of intelligence and to produce a new type of intelligent machine that responds in a manner similar to human intelligence. Researches of AI may include robotics, speech recognition, image recognition, natural language processing and expert systems.

With popularization of internet technology and development of artificial intelligence, people are increasingly relying on technologies such as retrieval engine, speech identification and semantic understanding. Moreover, in these technical applications, tasks of text error identification and error correction have also become important.

For most of the conventional methods of automatic text error correction, a machine learning method is used, in which the automatic error correction task is realised by using a classification principle in a noise channel model, or by using a traditional statistical machine translation manner to process the text to be error-corrected.

In the above method, the completion of the error correction task depending on feature designs is driven by the data. The model is faced with problems such as a high data normalization requirement, sparse data, poor universality of the model and inability to be used on a large scale. Meanwhile, due to lacking contextual syntax information, error correction accuracy is poor, which does not meet the user's expectations.

SUMMARY

Embodiments of the present disclosure provide a text error correction method based on a recurrent neural network of artificial intelligence. The method includes acquiring text data to be error-corrected; performing error correction on the text data to be error-corrected by using a trained recurrent neural network model so as to generate error-corrected text data.

Embodiments of the present disclosure provide a text error correction apparatus based on a recurrent neural network of artificial intelligence. The apparatus includes one or more processors; a memory; one or more software modules stored in the memory and executable by the one or more processors, and including: a first acquiring module configured to acquire text data to be error-corrected; and a processing module configured to perform error correction on the text data to be error-corrected by using a trained recurrent neural network model so as to generate error-corrected text data.

Embodiments of the present disclosure provide a computer-readable storage medium having stored therein computer programs that, when executed by a processor, causes the processor to perform the text error correction method based on a recurrent neural network of artificial intelligence, the method comprising: acquiring text data to be error-corrected; performing error correction on the text data to be error-corrected by using a trained recurrent neural network model so as to generate error-corrected text data.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
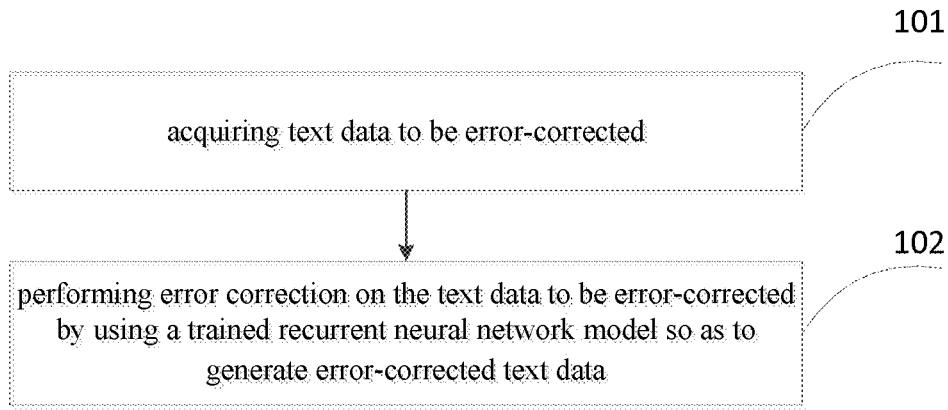
FIG. 1 is a flow chart of a text error correction method based on a recurrent neural network of artificial intelligence according to an embodiment of the present disclosure.

Reference will be made in detail to embodiments of the present disclosure. The embodiments described herein with reference to drawings are explanatory, illustrative, and configured to generally understand the present disclosure. The embodiments shall not be construed to limit the present disclosure. The same or similar elements and the elements having same or similar functions are denoted by like reference numerals throughout the descriptions.

Specifically, in the related art, text error correction mainly depending on feature designs is driven by the data and lacks contextual syntax information, thus resulting in poor error correction accuracy. In order to solve such a problem, a text error correction method based on a recurrent neural network of artificial intelligence is provided according to embodiments of the present disclosure. With the text error correction method based on a recurrent neural network of artificial intelligence according to embodiments of the present disclosure, after the text data to be error-corrected is acquired, the error correction is performed on the text data to be error-corrected by using the trained recurrent neural network model so as to generate error-corrected text data. Therefore, error correction is performed on the text data having errors by using the recurrent neural network model and combining the contextual syntax information, thus improving the error correction accuracy, better meeting the user's requirements, and improving the user's experience.

In embodiments of a first aspect of the present disclosure, a text error correction method based on a recurrent neural network of artificial intelligence is provided, including:

acquiring text data to be error-corrected;

performing error correction on the text data to be error-corrected by using a trained recurrent neural network model so as to generate error-corrected text data.

With the text error correction method based on a recurrent neural network of artificial intelligence according to an embodiment of the present disclosure, the text data to be error-corrected is acquired, and then the error correction is performed on the text data to be error-corrected by using the trained recurrent neural network model so as to generate error-corrected text data. Therefore, error correction is performed on the text data having errors by using the recurrent neural network model and combining the contextual syntax information, thus improving the error correction accuracy, better meeting the user's requirements, and improving the user's experience.

In an embodiment of the present disclosure, before performing error correction on the text data to be error-corrected, the method further includes:

acquiring a corpus of text pairs to be trained, each of the text pairs comprising an erroneous text and an accurate text corresponding to the erroneous text;

training a preset recurrent neural network model by using the corpus of the text pairs so as to determine the trained recurrent neural network model.

In an embodiment of the present disclosure, training a preset recurrent neural network model by using the corpus of the text pairs includes:

training a long short-term memory recurrent neural network model by using the corpus of the text pairs; or training a bi-directional recurrent neural network model by using the corpus of the text pairs.

In an embodiment of the present disclosure, acquiring the corpus of the text pairs to be trained includes:

identifying two voices continuously input within a preset time so as to generate a first text pair; or determining a second text pair according to two text retrieval sentences continuously input within a preset time.

In an embodiment of the present disclosure, acquiring the text data to be error-corrected comprises at least one of:

determining a language model score corresponding to input text data and less than a preset value; and determining the input text data to be the text data to be error-corrected by using a preset classification model.

In embodiments of a second aspect of the present disclosure, a text error correction apparatus based on a recurrent neural network of artificial intelligence is provided, including:

one or more processors;

a memory;

one or more software modules stored in the memory and executable by the one or more processors, and including:

a first acquiring module configured to acquire text data to be error-corrected; and a processing module configured to perform error correction on the text data to be error-corrected by using a trained recurrent neural network model so as to generate error-corrected text data.

In an embodiment of the present disclosure, the apparatus further includes:

a second acquiring module configured to acquire a corpus of text pairs to be trained, each of the text pairs comprising an erroneous text and an accurate text corresponding to the erroneous text;

a determining module configured to train a preset recurrent neural network model by using the corpus of the text pairs so as to determine the trained recurrent neural network model.

In an embodiment of the present disclosure, the determining module is specifically configured to:

train a long short-term memory recurrent neural network model by using the corpus of the text pairs; or train a bi-directional recurrent neural network model by using the corpus of the text pairs.

In an embodiment of the present disclosure, the second acquiring module is specifically configured to:

identify two voices continuously input within a preset time so as to generate a first text pair; or determine a second text pair according to two text retrieval sentences continuously input within a preset time.

In an embodiment of the present disclosure, the first acquiring module is specifically configured to perform at least one of:

determining a language model score corresponding to input text data and less than a preset value; and determining the input text data to be the text data to be error-corrected by using a preset classification model.

With the text error correction apparatus based on a recurrent neural network of artificial intelligence according to an embodiment of the present disclosure, the text data to be error-corrected is acquired, and then the error correction is performed on the text data to be error-corrected by using the trained recurrent neural network model so as to generate error-corrected text data. Therefore, error correction is performed on the text data having errors by using the recurrent neural network model and combining the contextual syntax information, thus improving the error correction accuracy, better meeting the user's requirements, and improving the user's experience.

The text error correction method and the text error correction apparatus according to embodiments of the present disclosure will be described with reference to drawings as follows.

FIG. 1 is a flow chart of a text error correction method based on a recurrent neural network of artificial intelligence according to an embodiment of the present disclosure.

As shown in FIG. 1, the method includes following blocks.

In block 101: text data to be error-corrected is acquired.

Specifically, an executive body of the text error correction method based on a recurrent neural network of artificial intelligence provided by an embodiment of the present disclosure is the text correction apparatus based on a recurrent neural network of artificial intelligence according to an embodiment of the present disclosure. The apparatus may be configured in any terminal device so as to perform error correction on the text data to be error-corrected.

In a specific implementation, the text data to be error-corrected may be a retrieval sentence input by a user in a retrieval engine, or a sentence input by a user in an interactive application such as WeChat, QQ, or in a service application, such as Baidu secretary.

In addition, the text data to be error-corrected may be text data obtained from speech recognition after a sentence of speech type is input by a user, or may be text data of text type directly input by the user, which is not limited herein.

In block 102, error correction is performed on the text data to be error-corrected by using a trained recurrent neural network model so as to generate error-corrected text data.

Specifically, a recurrent neural network model may be trained and generated by using a corpus of text pairs to be trained, so that after the text data to be error-corrected is acquired, error correction may be performed on the text data to be error-corrected by the recurrent neural network model trained and generated previously.

It will be understood that a plurality of text data may be generated after error correction is performed on the text data to be error-corrected by using the above recurrent neural network model. In such an embodiment, the plurality of text data generated is scored by using a manner such as a language model, an edit distance of texts before and after being rewritten, and a text pronunciation similarity, and is ranked according to the scores, so that the text data with the highest score is taken as the final text data error-corrected, thus improving reliability of text error correction.

Figure 2:
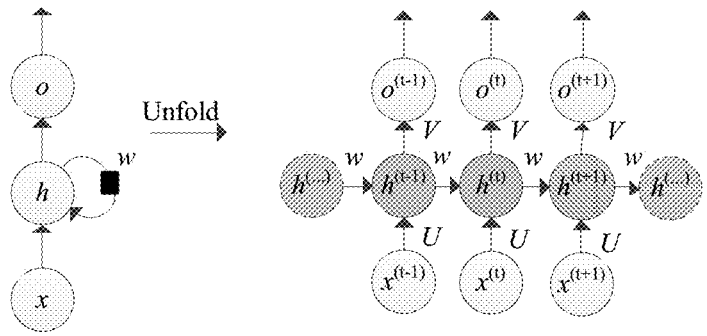
FIG. 2 is a schematic diagram of a recurrent neural network model according to an embodiment of the present disclosure.

With reference to FIG. 2, the recurrent neural network model used in the embodiments of the present disclosure is specifically described below.

As shown in FIG. 2, the recurrent neural network may be visualized by presenting it over time. It can be seen from FIG. 2, a structure of the recurrent neural network includes an input vector $\{x_1, x_2 \ldots x_n\}$ of an input layer, an output vector $\{o_1, o_2 \ldots o_n\}$ of an output layer, a hidden unit node h, a parameter weight matrix U for connecting the input layer nodes to hidden layer nodes, a parameter weight matrix W for connecting the hidden layer nodes with each other, and a parameter weight matrix V for connecting the hidden layer nodes to the output layer nodes, which are shared by nodes of each layer.

It can be seen from the structure of recurrent neural network, connections are formed between the adjacent hidden layer nodes of the recurrent neural network, and the input of hidden layer includes not only an output of input layer at the current moment, but also an output of hidden layer at the last moment. Therefore, the output of output layer is not only related to the input of the input layer at the current moment, but also to the input of the input layer at the previous moment.

Specifically, the hidden layer node $h_t$ (in $t^{th}$ step) may be obtained from a formula $h_t=f(Ux_t+Wh_{t-1})$, and the output layer of may be obtained from a formula $o_t=\text{softmax}(Vh_t)$, where $h_{t-1}$ is a state of the hidden layer in $(t-1)^{th}$ step, and f is generally a non-linear activation function such as a hyperbolic tangent function (tan h) or a rectified linear unit (ReLU).

It should be understood that, by using the above recurrent neural network model, the error correction is performed on the text data to be error-corrected, so that the error-corrected text data is not only related to a single word in the text data to be error-corrected, but also is summarized with contextual syntax information. Therefore, the text error correction method based on a recurrent neural network of artificial intelligence according to the embodiments of the present disclosure may have higher accuracy, better meet user's requirements and improve the user's experience, compared with methods of the prior art.

In a possible implementation of the present disclosure, before error correction is performed on the text data to be error-corrected by using the trained recurrent neural network model, a preliminary judgment whether there is an error in the text data to be error-corrected may be performed so as to reduce probability of performing error correction on accurate text data and improve the accuracy of text error correction. In other words, block 101 may further include followings.

In block 101a: a language model score corresponding to input text data is determined to be less than a preset value;

Specifically, the language model may be an n-gram model, a maximum entropy model, a maximum entropy Markov model, a neural network model, and so on.

It should be understood that a probability for an accurate sentence may be determined by using the language model. Therefore, in this embodiment of the present disclosure, the text data input by the user may be scored by using the language model. If the score is less than a preset value, it may be determined that there is a high probability that an error exists in the sentence. Therefore, only when there is a high probability that an error exists in the sentence, error correction is performed on the text data by using the trained recurrent neural network model so as to avoid performing error correction on the accurate text data, thus improving the text error correction accuracy.

Specifically, the preset value may be determined according to a type of the language model, performance of the language model, amount of the text data to be error-corrected, or other factors.

In block 101b: the input text data is determined to be the text data to be error-corrected by using a preset classification model.

Specifically, the classification model may be a classification model of a decision tree classifier, of a selection tree classifier, of an evidence classifier, of a Bayes text classifier, of a neural network classifier, or the like.

In a specific implementation, a classification model may be trained by a number of erroneous texts and corresponding accurate texts in advance. When the text data input by the user are classified by the classification model, "1" is output if a classification result of the text data is an accurate text, and "0" is output if the classification result of the text data is an erroneous text. Therefore, the text data input by the user may be input to the classification model after the text data input by the user are acquired, and when the output result of the classification model is "0", that is, when the classification model determines that the text data input by the user is the erroneous text, error correction is performed on the input text data by using the trained recurrent neural network model so as to avoid performing error correction on the accurate text data, thus improving the text error correction accuracy.

It should be noted that, in the embodiments of the present disclosure, the language model and the classification model may also be comprehensively used to make a preliminary judgment on the text data to be error-corrected. That is, the text data input by the user may be scored by using the language model firstly, and then the text data input by the user may be classified according to a preset classification model so as to determine the text data input by the user to be the text data to be error-corrected. When the score of the language model corresponding to the text data input by the user is determined to be less than the preset value and the classification model determines that the text data input by the user is an erroneous text, error correction is then performed on the input text data by using the trained recurrent neural network model so as to avoid performing error correction on the accurate text data, thus improving the text error correction accuracy.

With the text error correction method based on a recurrent neural network of artificial intelligence according to an embodiment of the present disclosure, the text data to be error-corrected is acquired, and then the error correction is performed on the text data to be error-corrected by using the trained recurrent neural network model so as to generate error-corrected text data. Therefore, error correction is performed on the text data having errors by using the recurrent neural network model and combining the contextual syntax information, thus improving the error correction accuracy, better meeting the user's requirements, and improving the user's experience.

Figure 3:
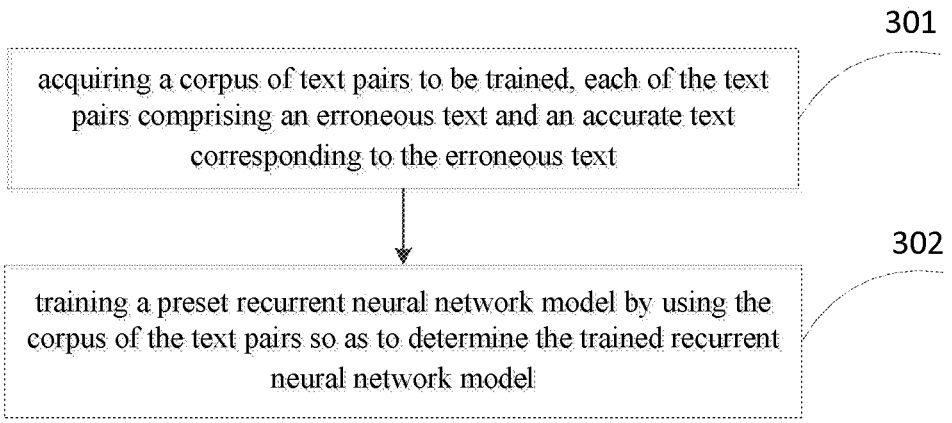
FIG. 3 is a flow chart of a method for training and generating a recurrent neural network model according to another embodiment of the present disclosure.

It can be seen from the above analysis, error correction may be performed on the text data to be error-corrected by using the trained recurrent neural network model so as to generate error-corrected text data, thus improving the text error correction accuracy. Referring to FIG. 3, a method for generating and training a recurrent neural network model in the text error correction method based on a recurrent neural network of artificial intelligence according to an embodiment of the present application is described in detail below.

FIG. 3 is a flow chart of a method for training and generating a recurrent neural network model according to another embodiment of the present disclosure.

As shown in FIG. 3, the method may include the followings.

In block 301: a corpus of text pairs to be trained is acquired, each of the text pairs including an erroneous text and an accurate text corresponding to the erroneous text.

In a specific implementation, a corpus of text pairs to be trained may be acquired through the following various methods.

Method I

Two voices continuously input within a preset time are identified so as to generate a first text pair.

Specifically, the preset time may be set according to practice requirements. For example, if the user's speech rate is slow or duration of the speech input by the user is long, the preset time may be set to be a longer time, and if the user's speech rate is fast or duration of the speech input by the user is short, the preset time may be set to be a shorter time.

It should be understood that, when the user inputs speech in applications such as a retrieval engine and an application software, the input speech may not be the result expected by the user due to an oral error, a low voice, or vague words. In this case, the user may input the speech to be expressed again once the user has input the first speech. In this embodiment of the present disclosure, the two speeches that are input in succession by the user in the preset time may be identified, and the identification result of two speeches may be determined as a first text pair. Specifically, an identification result of the first input speech is an erroneous text, and an identification result of the second input speech is an accurate text corresponding to the erroneous text.

Alternatively, in some applications having a speech recognition function, after the user inputs a speech for the first time, the application may identify the speech input by the user and present an identification result to the user. If it is determined by the user that the speech identification result is different from the sentence expected by the user, the speech may be input for another time until the identification result is the same as the sentence expected by the user. In this embodiment of the present disclosure, N speeches input in succession by the user in the preset time may be identified, and the identification results of the $(N-1)^{st}$ and $N^{st}$ speeches may be determined as a first text pair. Specifically, the identification result of the $(N-1)^{st}$ input speech is an erroneous text, and the identification result of the $N^{st}$ input speech is an accurate text corresponding to the erroneous text.

Method II

A second text pair is determined according to two text retrieval sentences continuously input within a preset time.

It will be understood that, the user may directly input a text-type retrieval sentence in the retrieval engine, and when the text retrieval sentence input at the first time is erroneous, the user may usually input the accurate retrieval sentence again. In this embodiment of the present disclosure, the two text retrieval sentences continuously input within a preset time may be directly determined as the second text pair. The text retrieval sentence input at the first time is an erroneous text, and the text retrieval sentence input at the second time is an accurate text corresponding to the erroneous text.

In block 302: a preset recurrent neural network model is trained by using the corpus of the text pairs so as to determine the trained recurrent neural network model.

It should be noted that the more corpus of text pairs are trained, the better the performance of the trained recurrent neural network model generated by training the preset recurrent neural network model with using the corpus of the text pairs is. Therefore, in this embodiment of the present disclosure, the preset recurrent neural network model may be trained by using a large amount of corpuses of the text pairs.

In a specific implementation, block 302 may specifically include the followings.

In block 302*a*: a first erroneous text is encoded by using a preset recurrent neural network so as to determine a vector matrix corresponding to an erroneous text.

In block 302*b*: the vector matrix is decoded to output a first text.

In block 302*c*: a preset weight coefficient of the preset recurrent neural network is revised according to a difference between a first text and the accurate text so as to determine a first revision model.

It will be understood that, the expression "a first erroneous text is encoded by using a preset recurrent neural network" means that a vector corresponding to the first erroneous text is processed by using a preset recurrent neural network.

In a specific implementation, the weight coefficient of the recurrent neural network model may be preset, and after the first erroneous text is input to the preset recurrent neural network model, the corresponding error correction result, i.e., the first text, may be generated by encoding the first erroneous text and decoding the vector matrix generated.

A first correction coefficient may be determined by comparing the first text with the accurate text corresponding to the first erroneous text, i.e., according to the difference between the first text and the accurate text, so as to revise the weight coefficient and determine a first revising model.

Subsequently, a second erroneous text is input to the preset recurrent neural network model, and the corresponding error correction result, i.e., a second text, is generated by encoding the second erroneous text and decoding the vector matrix generated.

A second correction coefficient may be determined by comparing the second text with the accurate text corresponding to the second erroneous text, i.e., according to the difference between the second text and the accurate text, so as to revise the revised weight coefficient again and determine a second revising model.

The above processes may be repeated, after the preset recurrent neural network is revised several times by using a large amount of corpuses of the text pairs, so as to determine a final weight coefficient and generate the trained recurrent neural network model.

It will be understood that, the recurrent neural network shown in FIG. 2 may utilize context information in a process for mapping an input vector to an output vector. However, the recurrent neural network shown in FIG. 2 has a limited size for storing context information, on this basis, impact of hidden layer input on the network output may be decreased with a continuous recursive network loop.

Accordingly, in an implementation of the present disclosure, the recurrent neural network model may be a long short-term memory (LSTM in short) recurrent neural network model. In other words, block 302 may include: training the long short-term memory recurrent neural network model by using the corpus of the text pairs so as to generate a trained long-short term recurrent neural network model.

Specifically, in the LSTM recurrent neural network model, a connection between the hidden layer nodes is a conventional connection manner of the hidden layer of the recurrent neural network, while each hidden layer node unit has a linear self-loop operation by introducing a gate structure.

Figure 4:
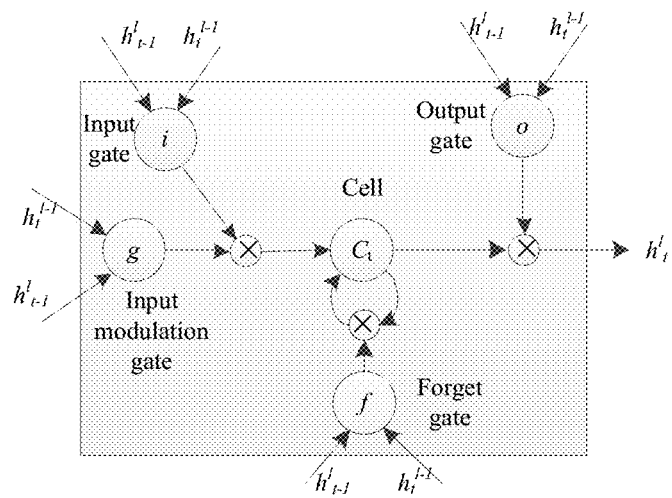
FIG. 4 is a schematic diagram of a long short-term memory recurrent neural network model according to an embodiment of the present disclosure.

As shown in the schematic diagram of hidden layer node in FIG. 4, the gate in the nodes includes a control gate, a forget gate, and an output gate. Through a unique structure design, LSTM may store a large size of contextual information. Therefore, error correction is performed on the text data to be error-corrected by using the LSTM recurrent neural network model so as to improve the accuracy of the error correction result.

Figure 5:
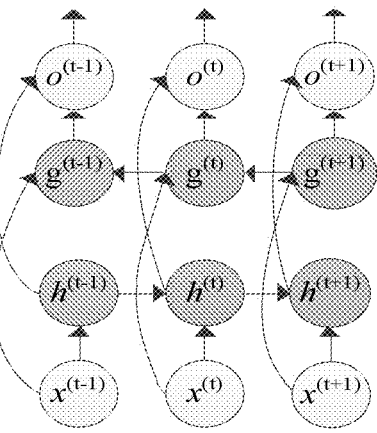
FIG. 5 is a schematic diagram of a bi-directional recurrent neural network model according to an embodiment of the present disclosure.

In addition, the recurrent neural network model shown in FIG. 2 may process data according to historical contextual information, but often neglecting future contextual information. In another implementation of the present disclosure, the recurrent neural network model may also be a bi-directional recurrent neural network model, as shown in FIG. 5. That is, block 302 may include: training a bi-directional recurrent neural network model by using the corpus of the text pairs so as to generate a trained bi-directional recurrent neural network model.

Specifically, as shown in FIG. 5, the bi-directional recurrent neural network model may be divided into a forward recurrent neural network and a backward recurrent neural network in which the forward recurrent neural network processes the input sentence from left to right in a forward direction and the backward recurrent neural network processes the input sentence from right to left in an opposite direction to the forward direction. The two recurrent neural networks are connected to one output layer.

With the above structure, it is possible to provide complete historical and future contextual information for each node in the input layer to the output layer. Therefore, in the embodiments of the present disclosure, the trained bi-directional recurrent neural network model is used to perform error correction on the text data to be error-corrected, so that the error-corrected text data is not only relates to a single word in the text data to be error-corrected, but also is summarized with the complete past and future contextual syntax information, thus realizing a higher accuracy of the error correction result, better meeting user's requirements and improving the user's experience.

With the text error correction method based on a recurrent neural network of artificial intelligence according to an embodiment of the present disclosure, a corpus of text pairs to be trained is acquired, and then a preset recurrent neural network model is trained by using the corpus of the text pairs so as to determine the trained recurrent neural network model. Thus, error correction is performed on the text data having errors by training a recurrent neural network model, using the trained recurrent neural network model and combining contextual syntax information, thus improving the error correction accuracy, meeting the user's requirements, and improving the user's experience.

Figure 6:
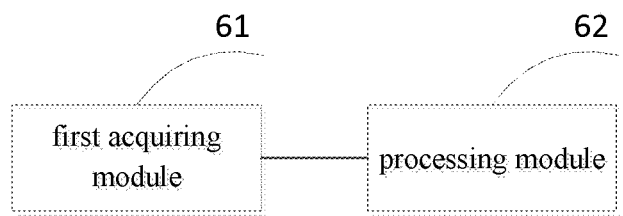
FIG. 6 is a block diagram of a text error correction apparatus based on a recurrent neural network of artificial intelligence according to an embodiment of the present disclosure.

FIG. 6 is a block diagram of a text error correction apparatus based on a recurrent neural network of artificial intelligence according to an embodiment of the present disclosure.

As shown in FIG. 6, the text error correction apparatus based on a recurrent neural network of artificial intelligence includes: one or more processors; a memory; one or more software modules stored in the memory and executable by the one or more processors, and including: a first acquiring module 61 and a processing module 62.

The first acquiring module 61 is configured to acquire text data to be error-corrected.

The processing module 62 is configured to perform error correction on the text data to be error-corrected by using a trained recurrent neural network model so as to generate error-corrected text data.

In a possible implementation of the present disclosure, the first acquiring module 61 is specifically configured to perform at least one of:

determining a language model score corresponding to input text data and less than a preset value; and determining the input text data to be the text data to be error-corrected by using a preset classification model.

The text error correction apparatus based on a recurrent neural network of artificial intelligence provided in this embodiment may be configured in any terminal device to execute the text error correction method based on a recurrent neural network of artificial intelligence according to the embodiments of the present disclosure so as to perform error correction on the text data to be error-corrected.

It should be noted that, the above explanations and illustrations of embodiments of the text error correction method based on a recurrent neural network of artificial intelligence are also applicable to embodiments of the text error correction apparatus based on a recurrent neural network of artificial intelligence, which is no more described in detail herein.

With the text error correction apparatus based on the recurrent neural network of artificial intelligence according to an embodiment of the present disclosure, the text data to be error-corrected is acquired, and then the error correction is performed on the text data to be error-corrected by using the trained recurrent neural network model so as to generate error-corrected text data. Therefore, error correction is performed on the text data having errors by using the recurrent neural network model and combining the contextual syntax information, thus improving the error correction accuracy, better meeting the user's requirements, and improving the user's experience.

Figure 7:
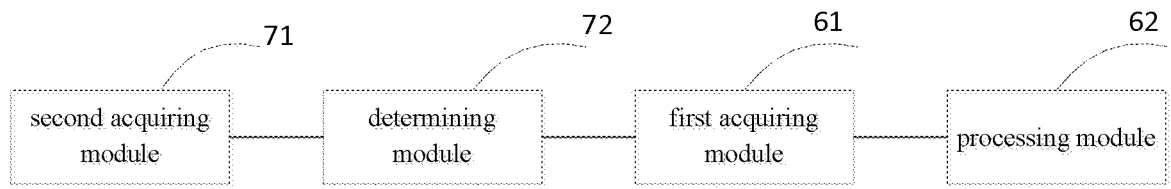
FIG. 7 is a block diagram of a text error correction apparatus based on a recurrent neural network of artificial intelligence according to another embodiment of the present disclosure.

FIG. 7 is a block diagram of a text error correction apparatus based on a recurrent neural network of artificial intelligence according to another embodiment of the present disclosure.

As shown in FIG. 7, based on FIG. 6, the text error correction apparatus based on a recurrent neural network of artificial intelligence further includes: a second acquiring module 71 and a determining module 72.

The second acquiring module 71 is configured to acquire a corpus of text pairs to be trained, each of the text pairs including an erroneous text and an accurate text corresponding to the erroneous text;

The determining module 72 is configured to train a preset recurrent neural network model by using the corpus of the text pairs so as to determine the trained recurrent neural network model.

In a possible implementation of the present disclosure, the determining module 72 is specifically configured to:

train a long short-term memory recurrent neural network model by using the corpus of the text pairs; or train a bi-directional recurrent neural network model by using the corpus of the text pairs.

In another possible implementation of the present disclosure, the second acquiring module 71 is specifically configured to:

identify two voices continuously input within a preset time so as to generate a first text pair; or determine a second text pair according to two text retrieval sentences continuously input within a preset time.

It should be noted that, the above explanations and illustrations of embodiments of the text error correction method based on a recurrent neural network of artificial intelligence are also applicable to embodiments of the text error correction apparatus based on a recurrent neural network of artificial intelligence, which is no more described in detail herein.

With the text error correction apparatus based on the recurrent neural network of artificial intelligence according to an embodiment of the present disclosure, the text data to be error-corrected is acquired, and then the error correction is performed on the text data to be error-corrected by using the trained recurrent neural network model so as to generate error-corrected text data. Therefore, error correction is performed on the text data having errors by using the recurrent neural network model and combining the contextual syntax information, thus improving the error correction accuracy, better meeting the user's requirements, and improving the user's experience.

Embodiments of a third aspect of the present disclosure provide a terminal device. The terminal device includes a processor; and a memory having stored therein computer programs that, when executed by the processor, causes the processor to perform a text error correction method based on a recurrent neural network of artificial intelligence according to the previous embodiments of the present disclosure.

Embodiments of a fourth aspect of the present disclosure provide a computer-readable storage medium having stored therein computer programs that, when executed by a processor, causes the processor to perform a text error correction method based on a recurrent neural network of artificial intelligence according to the previous embodiments of the present disclosure.

Embodiments of a fifth aspect of the present disclosure provide a computer program product that, when run on a computer, causes the computer to perform the text error correction method based on a recurrent neural network of artificial intelligence according to the previous embodiments of the present disclosure.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A text error correction method based on a recurrent neural network of artificial intelligence, comprising:
   acquiring text data to be error-corrected by:
      determining, using a language model, that a language model score corresponding to the input text data is less than a preset value; and
      determining, using a preset classification model, that the input text data is the text data to be error-corrected; and
   performing error correction on the text data to be error-corrected by using a trained recurrent neural network model so as to generate error-corrected text data, wherein the trained recurrent neural network model comprises an input layer having an input vector $\{x_1, x_2 \ldots x_n\}$, an output layer having an output vector $\{o_1, o_2 \ldots o_n\}$, and a hidden layer having a node of $h_t=f(Ux_t+Wh_{t-1})$, where t is a positive integer, U represents a parameter weight matrix for connecting the input layer to the hidden layer, W represents a parameter weight matrix for connecting a node of the hidden layer to another, and f represents a non-linear activation function, wherein $h_t$ and $h_{t-1}$ are each a state of a hidden layer node in a $t^{th}$ step and a $(t-1)^{th}$ step, respectively;
   wherein before performing error correction on the text data to be error-corrected, the method further comprises:
      acquiring a corpus of text pairs to be trained, each of the text pairs comprising an erroneous text and an accurate text corresponding to the erroneous text; and
      training a preset recurrent neural network model by using the corpus of the text pairs so as to determine the trained recurrent neural network model;
   wherein acquiring the corpus of text pairs to be trained comprises:
      receiving N inputs in succession from a user within a preset time, wherein the N inputs comprise speech or text, and N≥2; and
      determining identification results of an Nth input and an $(N-1)^{th}$ input of the N inputs as a first text pair of the corpus of text pairs, wherein the $(N-1)^{th}$ input is the erroneous text and the Nth input is the accurate text corresponding to the erroneous text.

2. The method of claim 1, wherein training the preset recurrent neural network model by using the corpus of the text pairs comprises:
   training a long short-term memory recurrent neural network model by using the corpus of the text pairs; or
   training a bi-directional recurrent neural network model by using the corpus of the text pairs.

3. A text error correction apparatus based on a recurrent neural network of artificial intelligence, comprising:
   one or more processors; and
   a memory,
   wherein one or more software modules are stored in the memory and executable by the one or more processors, and comprising:
   a first acquiring module configured to acquire text data to be error-corrected by:
      determining, using a language model, that a language model score corresponding to the input text data is less than a preset value; and
      determining, using a preset classification model, that the input text data is the text data to be error-corrected; and
   a processing module configured to perform error correction on the text data to be error-corrected by using a trained recurrent neural network model so as to generate error-corrected text data, wherein the trained recurrent neural network model comprises an input layer having an input vector $\{x_1, x_2 \ldots x_n\}$, an output layer having an output vector $\{o_1, o_2 \ldots o_n\}$, and a hidden layer having a node of $h_t=f(Ux_t+Wh_{t-1})$, where t is a positive integer, U represents a parameter weight matrix for connecting the input layer to the hidden layer, W represents a parameter weight matrix for connecting a node of the hidden layer to another, and f represents a non-linear activation function, wherein $h_t$ and $h_{t-1}$ are each a state of a hidden layer node in a $t^{th}$ step and a $(t-1)^{th}$ step, respectively;
   wherein the one or more software modules further comprises:
   a second acquiring module configured to acquire a corpus of text pairs to be trained, each of the text pairs comprising an erroneous text and an accurate text corresponding to the erroneous text; and
   a determining module configured to train a preset recurrent neural network model by using the corpus of the text pairs so as to determine the trained recurrent neural network model;
   wherein the second acquiring module is specifically configured to receive N inputs in succession from a user within a preset time, wherein the N inputs comprise speech or text, and N≥2, and determine identification results of an Nth input and an $(N-1)^{th}$ input of the N inputs as a first text pair of the corpus of text pairs, wherein the $(N-1)^{th}$ input is the erroneous text and the Nth input is the accurate text corresponding to the erroneous text.

4. The apparatus of claim 3, wherein the determining module is specifically configured to:
- train a long short-term memory recurrent neural network model by using the corpus of the text pairs; or
- train a bi-directional recurrent neural network model by using the corpus of the text pairs.

5. A non-transitory computer-readable storage medium having stored therein computer programs that, when executed by a processor, causes the processor to perform a text error correction method based on a recurrent neural network of artificial intelligence, the method comprising:
- acquiring text data to be error-corrected by:
  - determining, using a language model, that a language model score corresponding to the input text data is less than a preset value; and
  - determining, using a preset classification model, that the input text data is the text data to be error-corrected; and
- performing error correction on the text data to be error-corrected by using a trained recurrent neural network model so as to generate error-corrected text data, wherein the trained recurrent neural network model comprises an input layer having an input vector $\{x_1, x_2 \ldots x_n\}$, an output layer having an output vector $\{o_1, o_2 \ldots o_n\}$, and a hidden layer having a node of $h_t = f(Ux_t + Wh_{t-1})$, where t is a positive integer, U represents a parameter weight matrix for connecting the input layer to the hidden layer, W represents a parameter weight matrix for connecting a node of the hidden layer to another, and f represents a non-linear activation function, wherein $h_t$ and $h_{t-1}$ are each a state of a hidden layer node in a $t^{th}$ step and a $(t-1)^{th}$ step, respectively;

wherein before performing error correction on the text data to be error-corrected, the method further comprises:
- acquiring a corpus of text pairs to be trained, each of the text pairs comprising an erroneous text and an accurate text corresponding to the erroneous text; and
- training a preset recurrent neural network model by using the corpus of the text pairs so as to determine the trained recurrent neural network model;

wherein acquiring the corpus of text pairs to be trained comprises:
- receiving N inputs in succession from a user within a preset time, wherein the N inputs comprise speech or text, and N≥2; and
- determining identification results of an Nth input and an $(N-1)^{th}$ input of the N inputs as a first text pair of the corpus of text pairs, wherein the $(N-1)^{th}$ input is the erroneous text and the Nth input is the accurate text corresponding to the erroneous text.

6. The non-transitory computer-readable storage medium of claim 5, wherein training the preset recurrent neural network model by using the corpus of the text pairs comprises:
- training a long short-term memory recurrent neural network model by using the corpus of the text pairs; or
- training a bi-directional recurrent neural network model by using the corpus of the text pairs.

* * * * *